(12) United States Patent
Sassanelli et al.

(10) Patent No.: US 11,859,498 B2
(45) Date of Patent: Jan. 2, 2024

(54) LABYRINTH SEALING DEVICE

(71) Applicant: NUOVO PIGNONE TECNOLOGIE S.R.L., Florence (IT)

(72) Inventors: Giuseppe Sassanelli, Florence (IT); Emanuele Rizzo, Florence (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 115 days.

(21) Appl. No.: 17/309,966

(22) PCT Filed: Jan. 8, 2020

(86) PCT No.: PCT/EP2020/025002
§ 371 (c)(1),
(2) Date: Jul. 6, 2021

(87) PCT Pub. No.: WO2020/144087
PCT Pub. Date: Jul. 16, 2020

(65) Prior Publication Data
US 2022/0065123 A1  Mar. 3, 2022

(30) Foreign Application Priority Data

Jan. 10, 2019   (IT) .......................... 102019000000373

(51) Int. Cl.
*F01D 11/02* (2006.01)
*F01D 11/00* (2006.01)
*B33Y 80/00* (2015.01)

(52) U.S. Cl.
CPC .......... *F01D 11/025* (2013.01); *F01D 11/001* (2013.01); *B33Y 80/00* (2014.12)

(58) Field of Classification Search
CPC ........ F01D 11/00; F01D 11/001; F01D 11/02; F01D 11/025; F01D 11/08; F01D 11/10; F01D 11/12; F01D 11/122; B33Y 80/00
(Continued)

(56) References Cited

U.S. PATENT DOCUMENTS

| 2008/0265513 | A1 | 10/2008 | Justak | |
| 2013/0058766 | A1* | 3/2013 | Zheng | F01D 11/003 277/303 |
| 2017/0145847 | A1* | 5/2017 | Zhang | F16J 15/445 |

FOREIGN PATENT DOCUMENTS

| FR | 2199386 A5 * | 4/1974 | ............... F16J 15/54 |
| GB | 1544986 A | 4/1979 | |

(Continued)

*Primary Examiner* — Nathan Cumar
(74) *Attorney, Agent, or Firm* — Paul Frank + Collins P.C.

(57) ABSTRACT

A device configured to seal a circumferential gap between a first turbomachine component and a second turbomachine component mutually rotatable about a longitudinal axis. The device is provided with a first sealing element connected to the first turbomachine component and with a second sealing element having an inner part provided with a plurality of projections extending towards the second machine component to define the teeth of a labyrinth seal between the high pressure region and the low pressure region of the turbo machine. The outer part of the second sealing element is connected to the first sealing element through an elastic element. One or more pressure chambers located between the first sealing element and the second sealing element are in fluid communication with the processing fluid of the turbomachine to derive a force acting on the outer part of the second sealing element in the direction of gap closure.

14 Claims, 7 Drawing Sheets

(58) Field of Classification Search
USPC .......................................................... 277/412
See application file for complete search history.

(56) References Cited

FOREIGN PATENT DOCUMENTS

| WO | 2013/034655 A1 | 3/2013 | |
| WO | 2014/022290 A1 | 2/2014 | |
| WO | 2016/022136 A1 | 2/2016 | |
| WO | WO-2017178758 A1 * | 10/2017 | ............. F16J 15/406 |

* cited by examiner

| Case | Impeller effect on gap (centrifugal force) | Impeller effect on gap (thermal) | Impeller effect on gap (vibrations) | Stator effect on gap | Requirement | Notes |
|---|---|---|---|---|---|---|
| Critical speed | Medium-low Closure | Absent | Maximum Closure | Absent | No damage | Gap closure is driven by rotor vibrations |
| Mechanical Running Test | Maximum Closure | Low closure (localized) | Medium-low closure depending on mode | Large Closure (hot seal/cold diaph.) | No damage | Gap closure is driven by centrifugal force. This is the worst case for gap closure |
| Type II test | Medium Closure | Medium Closure | Low | Small closure or Opening since the stator thermal expansion | Minimum clearance | Generally low pressure and medium/high temperature |
| Operating condition | Medium Closure | Medium Closure | Low | Small closure or Opening since the stator thermal expansion | Minimum clearance | Full load case |

Fig. 1

LABYRINTH SEALING DEVICE

BACKGROUND OF THE INVENTION

Embodiments of the subject matter disclosed herein generally relate to turbomachines, and more particularly, to devices and methods for improving performances and rotordynamics in turbomachines. Labyrinth seals are commonly used in order to seal two regions at different pressure in turbomachines such as pumps, centrifugal compressors and turbines. Labyrinth seals include a number of grooves or teeth that form a tortuous path, or "labyrinth" between a stationary portion, or "stator," and a rotating portion, or "rotor," of the turbomachine. Labyrinth seals may be statoric, in which the teeth are formed on the stator, or rotoric, in which the teeth are formed on the rotor. The grooves or teeth of the labyrinth seal and opposing surface impede the flow of fluids from the high pressure region to the low pressure region through the labyrinth seal. However, a space or clearance is necessary between the labyrinth grooves or teeth and an opposing surface to allow rotation of the rotor. Thus, although labyrinth seals impede fluid flow, the clearance allows highly pressurized fluid from the high pressure region to leak through the clearance to the low pressure region due to a pressure differential across the labyrinth seal. Labyrinth seals in general are designed to contain this leakage.

Leakage flow through the labyrinth seal may be reduced by decreasing the clearance. To this end, abradable labyrinth seals have been developed. Stator labyrinth seals are statoric labyrinth seals in which the statoric teeth are formed of a softer material, such as aluminium, in order to preserve the rotor in case of contact. This, however, brings to a damage of the teeth and thus to an increase of the clearances with following loss of performances.

For these reasons, in standard solutions, the clearances are designed to be large enough to avoid contact, especially during the crossing of critical speeds, i.e. the resonance speed at which the rotor experiences the maximum vibrations. This, however, causes high leakage when the turbomachine is in operating condition with full load, operating usually far from critical speeds.

To overcome this drawback, the today state of the art in centrifugal compressor design is to use alternative materials like thermoplastics in order to absorb the shock with the rotor without damaging the teeth of the seal. The clearance can be kept low at the design stage as the elastic deformation of the teeth allows to return to the original clearance after contact.

To avoid contact with the rotor is not, however, the only requirement for a labyrinth seal. Optimal clearance is also to be guaranteed in various working conditions, i.e. speed and pressure.

Halo seals as disclosed in U.S. Pat. No. 8,002,285 allow to set variable clearances depending on pressure, particularly to decrease seal clearances with pressure by using spring elements. These seals are, however, expensive, suffer from the problem of rotor contact typical of any metallic seal as discussed above and, due to their small axial dimension, can work in high pressure applications only if stacked thus complicating the resulting structure and increasing costs significantly.

Therefore there is a need for a compliant seal capable of adjusting the clearances at various working condition which is cheap and easily to manufacture.

BRIEF DESCRIPTION OF THE INVENTION

According to first exemplary embodiments, a device configured to seal a circumferential gap between a first turbomachine component and a second turbomachine component rotatable relative to the first turbomachine component about a longitudinal axis, is described. The device comprises two sealing elements: a first sealing element connected to the first turbomachine component, and a second sealing element. The second sealing element, in turn, has an inner part and an outer part. The inner part of the second sealing element is provided with a plurality of projections extending towards the second machine component to define the teeth of a labyrinth seal between the high pressure region and the low pressure region of the turbomachine. The outer part of the second sealing element is connected to the first sealing element through an elastic element to allow the distance between the first sealing element and the second sealing element to vary depending on the fluid dynamic forces acting on the turbomachine components. The device may comprise one or more pressure chambers located between the first sealing element and the second sealing element and configured to be in fluid communication with the processing fluid of the turbomachine to derive from such fluid communication a force acting on the outer part of the second sealing element in the direction of gap closure to automatically adapt the clearance to various operating conditions.

In an embodiment, at least one pressure chamber of the device is in communication with the processing fluid of the turbomachine through one or more passageways in the first and/or the second sealing element, particularly the second sealing element comprises a circumferential slot defining a channel putting into fluid communication at least one pressure chamber of the device with the processing fluid of the turbomachine.

In an embodiment, the slot is at least partially located in the high pressure region of the turbomachine. In another embodiment, at least one passageway is located between a couple of consecutive teeth of the labyrinth seal to collect a fluid having an intermediate pressure between the high and the low pressure zones of the turbomachine. This allows to modulate the force acting on the seal to best fit various working conditions.

In an example, more passageways may be provided in fluid communication with consecutive pressure chambers to collect fluid having different pressures to derive forces acting on the outer part of the second sealing element with decreasing intensity from the high to the low pressure zones of the turbomachine.

In an embodiment, at least one stopper element is provided to limit the movement of the second sealing element away from the first sealing element towards the second turbomachine component to set a threshold for gap closure. More axially spaced apart stopper elements may be advantageously used to improve the locking action. This allows to use less rigid materials or design thus rendering the seal more reactive to low pressures.

For no differential pressure between the inner and outer part of the second sealing element, the adequate clearance is assured by advantageously configuring the second sealing element to be spaced apart from the first sealing element to define an initial gap, which initial gap is gradually reduced with increasing differential pressures till the threshold is reached.

In an embodiment, the second sealing element is an elastically deformable element hinged at the first sealing element, the variable distance between the first sealing element and the second sealing element depending on the deformation of the second sealing element with respect to the first sealing element.

BRIEF DESCRIPTION OF THE DRAWINGS

Aspects of the present invention will become more apparent from the following description of exemplary embodiments to be considered in conjunction with accompanying drawings wherein:

FIG. 1 is a table summing up the effects of various parameters on clearance gap in a labyrinth seal at different working conditions;

The following description of exemplary embodiments refer to the accompanying drawings. The same reference numbers in different drawings identify the same or similar elements. The following detailed description does not limit the invention. Instead, the scope of the invention is defined by the appended claims.

DETAILED DESCRIPTION OF THE INVENTION

Turbomachines comprise parts and components that rotates with respect to each other, interfacing regions kept at very different operating pressures. The use of efficient seals is thus of paramount importance to avoid leakages of the process fluids, performance losses and damages to the parts of the turbomachine. Labyrinth seals are a type of mechanical seal that provides a tortuous path to help prevent leakage and are often employed to seal rotating components of turbomachines. Embodiments described herein provide a labyrinth sealing device configured to seal (or that can seal) a circumferential gap between mutually rotatable turbomachine components. The device comprises two sealing elements: a first sealing element, which may be connected to the first turbomachine component, and a second sealing element. The second sealing element, in turn, has an inner part and an outer part. The inner part is provided with a plurality of projections extending towards the second machine component to define the teeth of a labyrinth seal. The outer part is connected to the first sealing element through an elastic element to allow the distance between the first sealing element and the second sealing element to vary depending on the fluid dynamic forces acting on the turbomachine components thus allowing greater efficiency and flexibility of use.

As it can be appreciated by looking at the table of FIG. 1, the clearance gap between a labyrinth seal and a rotor is affected by several parameters. Among them, rotor speed (centrifugal force), rotor vibrations and temperature/pressure play a key role. A proper design would thus need to consider the following requirements for a seal:

1. To be tolerant to unexpected vibrations and in off-design conditions;
2. To have a positive gap during the no-pressure cases such as at $1^{st}$ critical speed crossing;
3. To have the minimum gap during the factory acceptance test case;
4. To have the minimum gap in the normal pressure case (site conditions).

The sealing device according to embodiments herein allows to reach the operative gap with differential pressures less than 1 bar and keep it controlled until the maximum pressure.

Figure 2:
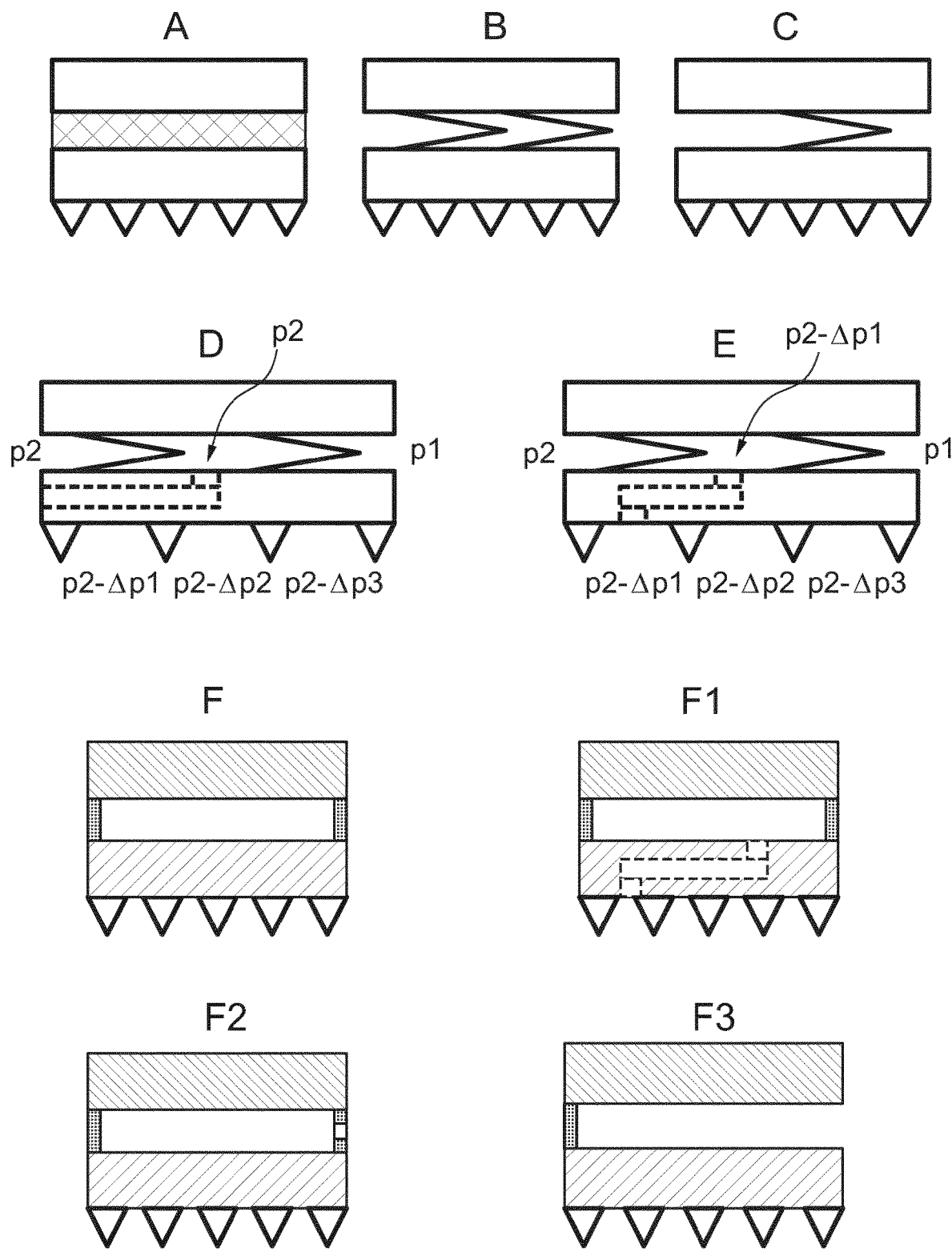
FIG. 2, FIG. 3 and FIG. 4 show schematic views of labyrinth seals according to embodiments herein.

To such extent, elasticity is introduced in the component by less stiff material and a less stiff design. FIG. 2 shows, in an exemplified way, possible alternatives referenced with letters A to F3:

A—A labyrinth seal with an elastic medium between the teeth and the housing working as shock absorber. The elastic medium shall be perfectly sealed with the housing and seal;

B—A labyrinth seal with a plurality of springs. A ring spring-like design is possible, for example, by joining different components by welding or brazing or by additive manufacturing. The shape of the elastic system can be «V-shaped», «C-shaped», «S-shaped» or whatever shape able to introduce elasticity in the system;

C—Like B with only one spring. The number of elastic elements shall be suitable with the desired stiffness and can vary accordingly;

D—Like B with the addition of a channel connecting a high pressure zone (p2) to an intermediate chamber in order to control gap closure with the pressure. The intermediate chambers need to be sealed and isolated from each other;

E—Like D with the possibility to connect the intermediate chamber of the seal with a given intermediate labyrinth gap at higher pressure (p2-Δp1);

F—A labyrinth seal with elastic walls;

F1—as F wherein the intermediate chamber can be pressurized with an intermediate pressure as in E;

F2—as F wherein the intermediate chamber can be pressurized with the high pressure (p2) or low pressure (p1) by holes on one of the vertical walls. These holes can be properly shaped in order to introduce some elasticity in the wall;

F3—single wall version to have more flexibility.

The number of elastic elements, defining also the intermediate chambers, is a design parameter together with the pressure connection points.

Figure 3:
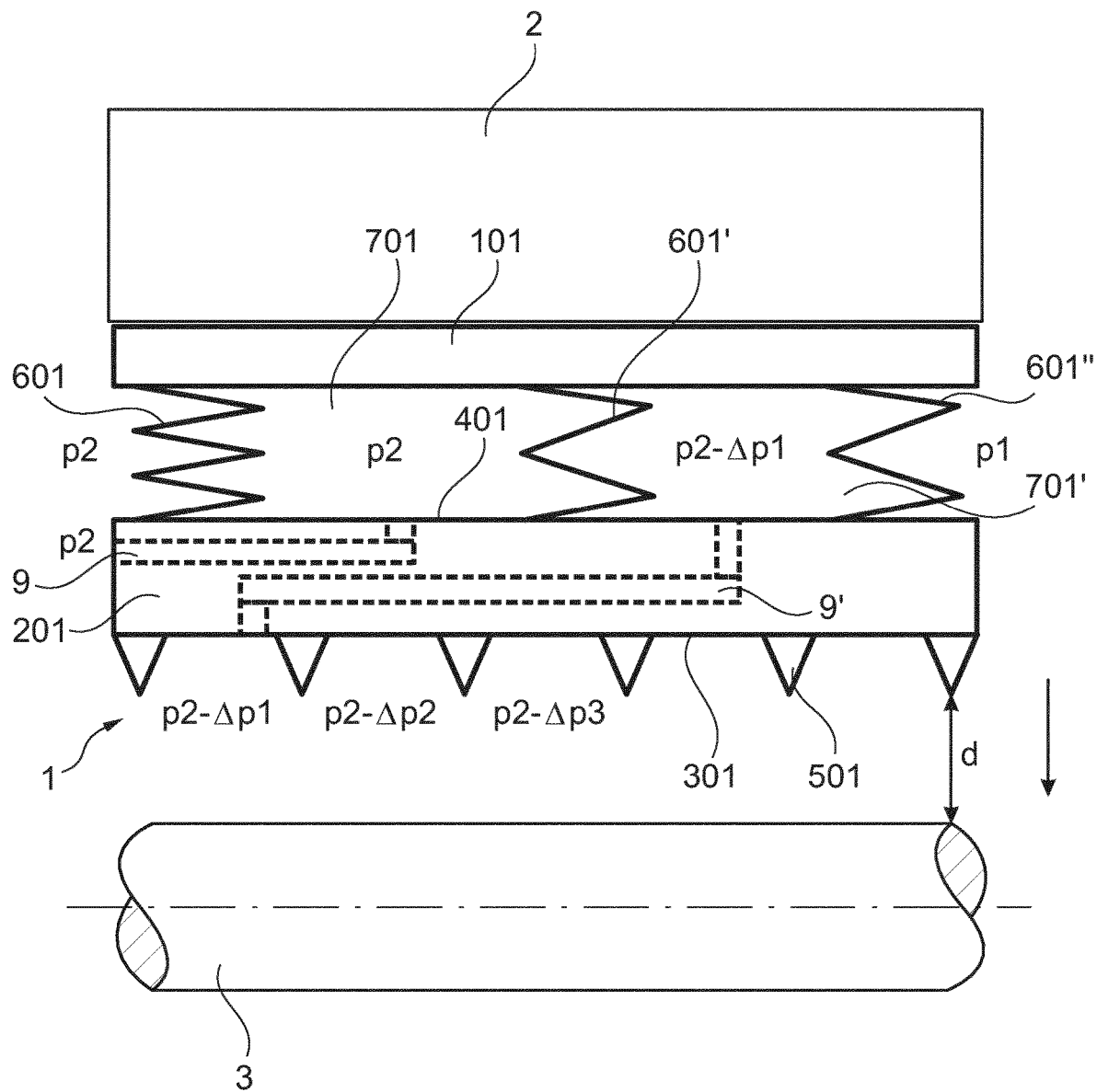

FIG. 3 shows a more complex configuration with two intermediate chambers respectively connected with high pressure p2 and p2-Δp1.

With reference to the embodiment shown in this figure, the seal 1 is a device comprising a first sealing element 101 connected to a first turbomachine component 2 (for example a stator) and a second sealing element 201 coupled with a second turbomachine component 3 (for example a rotor). The second sealing element 201 has an inner part 301 and an outer part 401. The inner part 301 of the second sealing element 201 has a plurality of projections 501 extending towards the second machine component 2 to define the teeth of a labyrinth seal between the high pressure region and the low pressure region of the turbomachine indicated respectively with p2 and p1. In this embodiment, the outer part 401 of the second sealing element 201 is coupled with the first sealing element 101 through three elastic elements 601, 601', 601" defining two pressure chambers 701, 701' to allow the distance between the first sealing element 101 and the second sealing element 201 to vary depending on the fluid dynamic forces acting on the turbomachine components. The pressure chambers 701, 701' located between the first sealing element 101 and the second sealing element 201 are in fluid communication with the processing fluid of the turbomachine to derive a force acting on the outer part 401 of the second sealing element 201 in the direction of gap closure (as shown by the arrow in FIG. 3) to automatically adapt the clearance d between the seal and the rotor to various operating conditions.

The elastic elements and intermediate chambers can be in any number depending on design constraints and can assume any shape as those, for example, shown in FIG. 2. That means that the elastic elements can be in the form of walls, springs or combination thereof with or without intermediate chambers to be accessed through holes in the walls and/or in the sealing elements to derive the most appropriate intermediate pressures for those embodiments requiring so.

Figure 4:
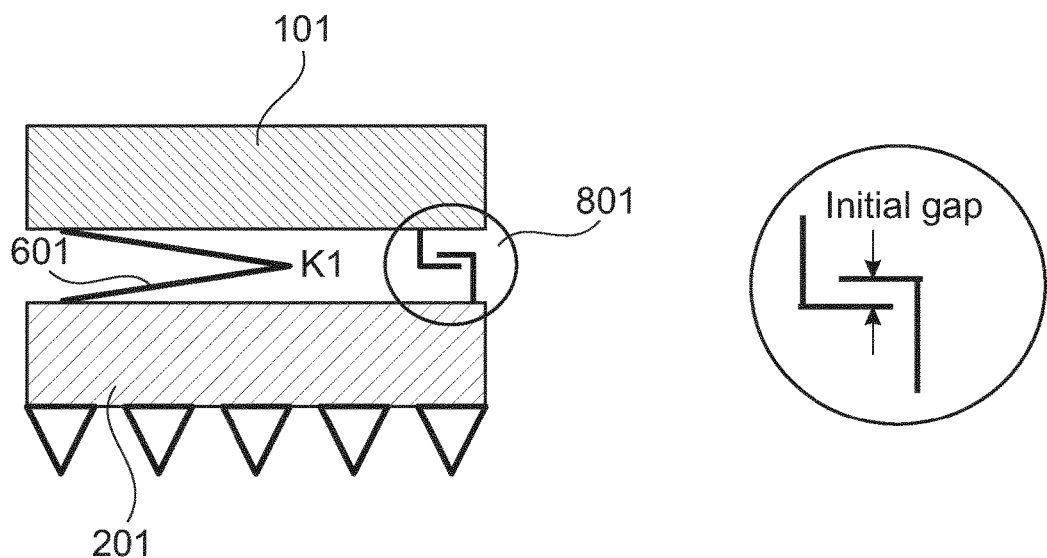

Reverting to the table of FIG. 1, it is to be noted that an optimum seal needs to satisfy the requirements of having large gap at $1^{st}$ critical speed, small gap at very low pressure and also at high pressure. This results in a flexible seal (to properly work at low pressure) but also in a rigid seal (to properly work at full pressure). These contrasting needs are balanced by the use of a mechanical stop 801 in order to contain deformation above a given pressure as in the embodiment shown in FIG. 4.

Figure 5:
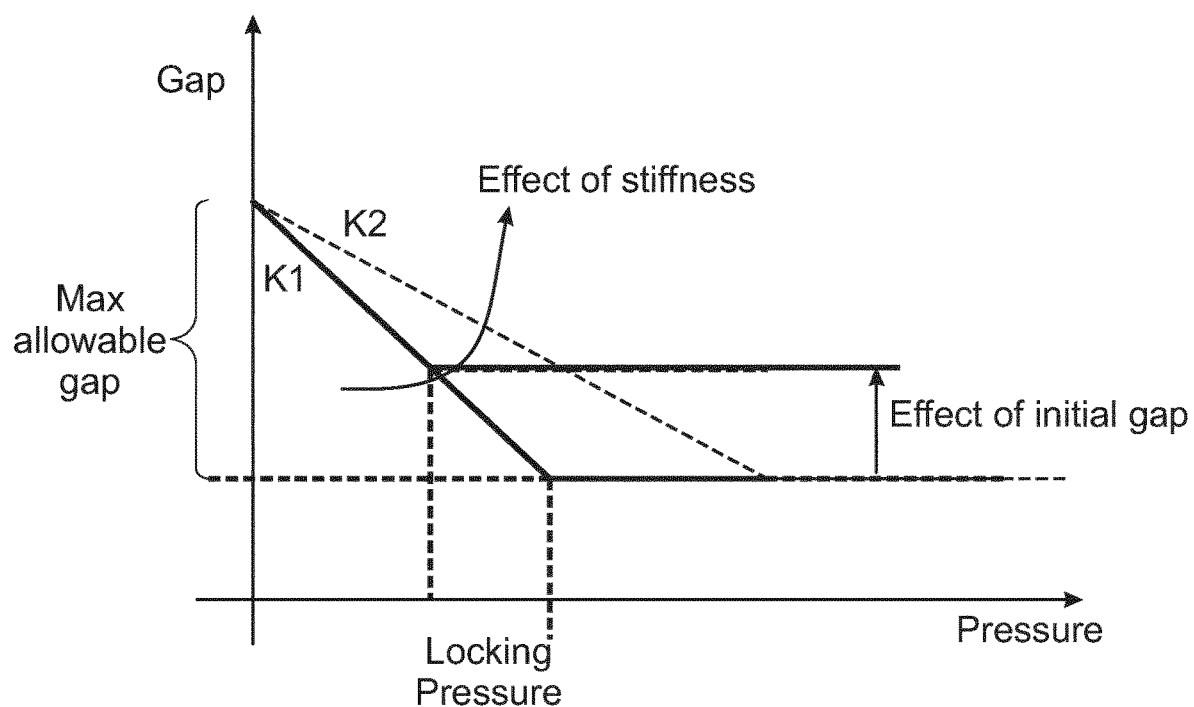
FIG. 5 shows the behavior of seal deformation vs differential pressure in devices according to embodiments herein.

The mechanical stop locks the seal deformation to a given value as shown in FIG. 5. In the graph of this figure, on X-axis there is the differential pressure DP acting on the second sealing element in the direction of gap closure, while on the Y-axis there is the deformation of the seal, i.e. the clearance gap between the seal and the rotor. The value at DP=0 is set by adjusting the initial gap of the stopper, the pendency of the curve is determined by the elasticity of the material according to the well-known Hook law, while the saturation for DP values greater than the locking pressure is due to the action of the stopper that provides a threshold to the deformation.

The maximum allowable gap is thus controlled by the design of the mechanical stop while the locking pressure is controlled by the system stiffness (elastic constant) and by the initial gap in the internal locking system.

In an advantageous configuration, the locking pressure can be controlled also by using proper pressures in the chambers by spilling fluid from the labyrinth seal at different longitudinal distance using one or more channels connected with the intermediate pressures as discussed above with reference to FIG. 3. The values Δp1, Δp2, Δp3 shown in this figure represent the pressure drops the processing fluid encounter while moving from the high pressure side (p2) to the low pressure side (p1) of the turbomachine.

By acting on the pressure of the intermediate chamber(s), the locking state can be reached at different locking pressures thus providing a powerful fine-adjusting mechanism.

In an embodiment, referred to in FIG. 6 to FIG. 10, the second sealing element is an elastically deformable element hinged at the first sealing element, and the variable distance between the first sealing element and the second sealing element depends on the deformation of the second sealing element with respect to the first sealing element. The elastic element configured to allow the distance between the first sealing element and the second sealing element to vary depending on the fluid dynamic forces acting on the turbomachine components, is therefore distributed on almost the whole length of the seal.

Figure 8:
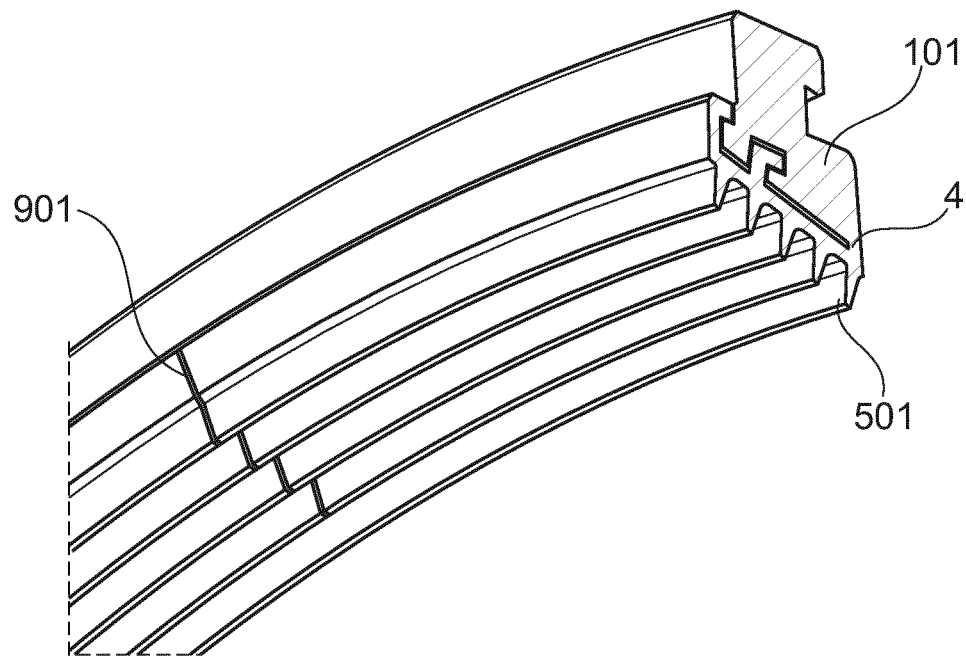
FIG. 8 shows perspective views of a portion of the labyrinth seal according to embodiments employing one single material.
Figure 9:
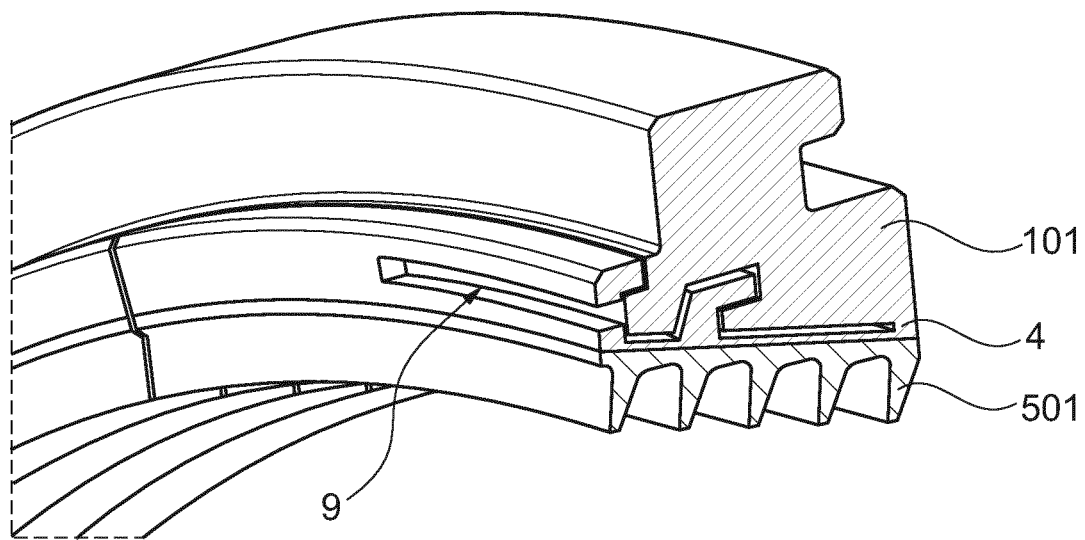
FIG. 9 and FIG. 10 show perspective views of a portion of the labyrinth seal according to embodiments employing bi-material.
Figure 10:
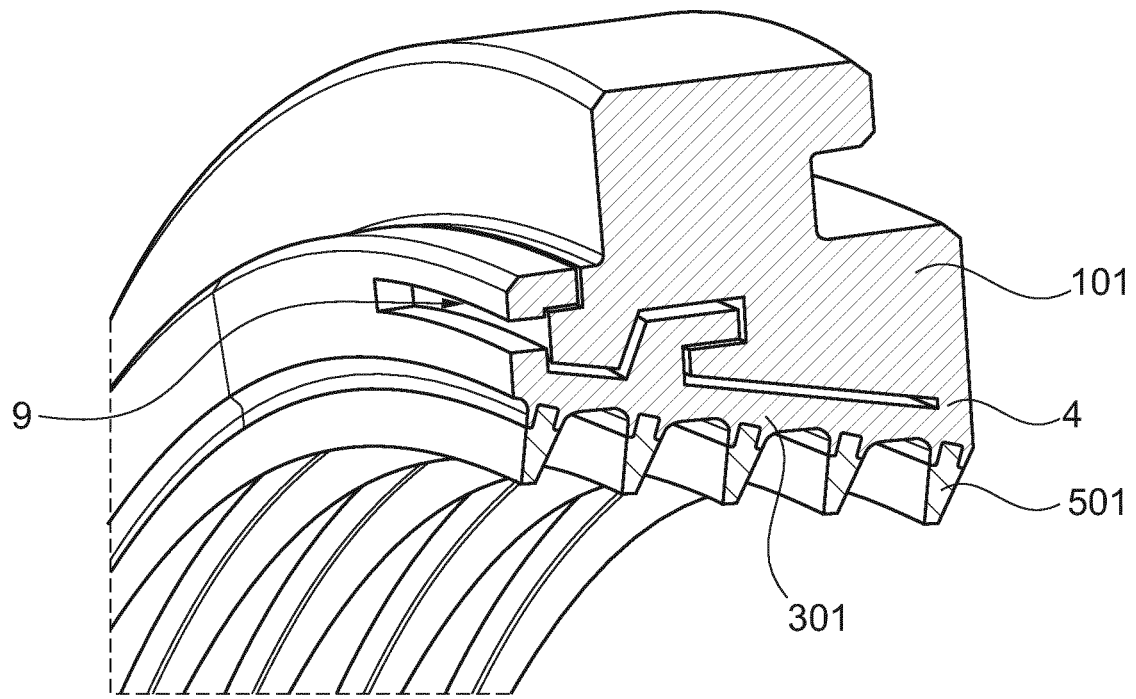

Referring now to FIG. 8, FIG. 9 and to FIG. 10, the sealing device 1 according to embodiments of the present disclosure is intended to create a seal of the circumferential gap between two relatively rotating components, namely, a fixed stator 2 and a rotating rotor 3. The device may be implemented in any type of turbomachine in which a connection between a high pressure region and a low pressure region exists. For example, device 1 may be implemented in a centrifugal compressor, an expander, a turbine, a pump, etc.

The device 1 includes at least one, but preferably a plurality of adjacent labyrinth seals 201 (also referenced herein as rotoric portions or second sealing elements), circumferentially spaced by radial cuts 901, which are located in a non-contact position along the exterior surface of the rotor 3.

The plurality of grooves forming the teeth 501 of the labyrinth seals may be machined or, in a particularly advantageous configuration, grown through additive manufacturing such that portions of higher elevation (also referred as "teeth") formed between and by the grooves have a profile consistent with any requirements of an application of the device. For example, the tooth profile may be squared, trapezoidal, triangular, or any other shape that may be beneficial to a particular application of the device.

Figure 6:
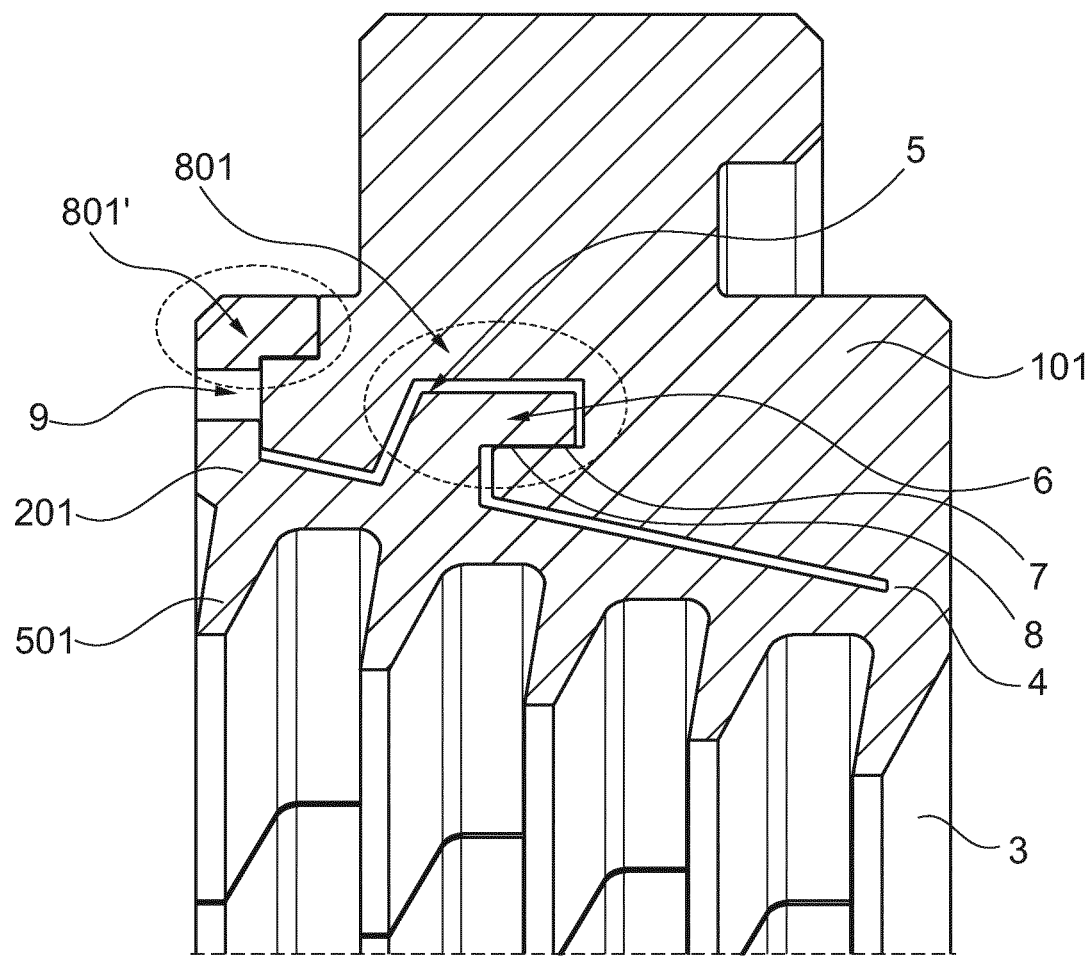
FIG. 6 shows a cross sectional view of a labyrinth seal according to embodiments herein.
Figure 7:
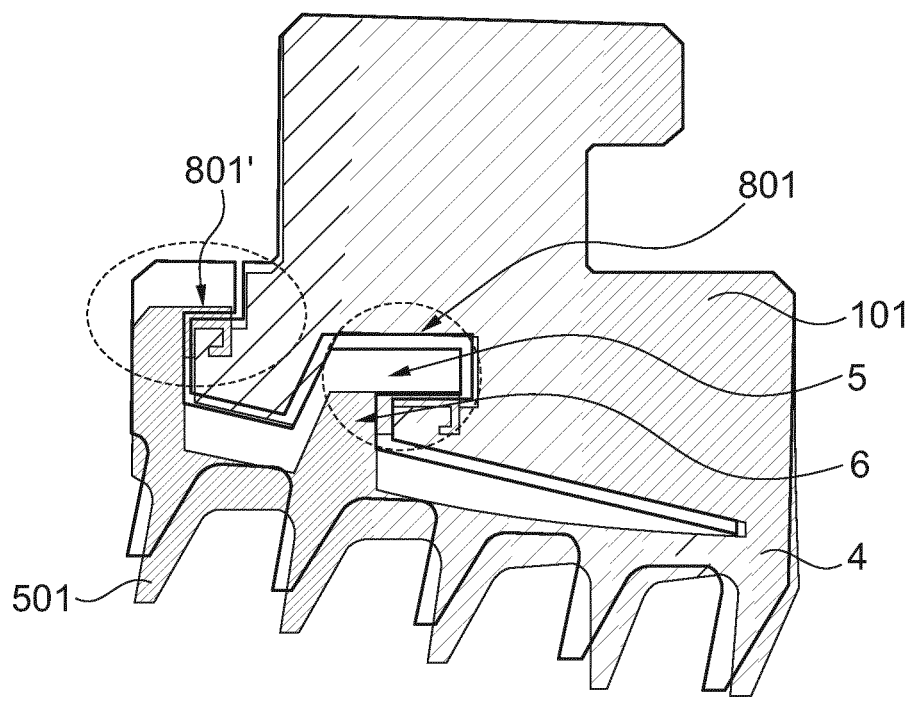
FIG. 7 shows the same view of FIG. 6 with the sealing element in its maximum deformation status.

The labyrinth seals 201 are hinged at one extremity 4 to a statoric portion 101 (also referenced in the present disclosure as first sealing element) of the turbomachine to allow elastic deformation of the sealing device as best shown in FIG. 6 and FIG. 7.

The statoric portion 101 has circumferential notches 5 for receiving corresponding circumferential protrusions 6 of the labyrinth seals 201, the circumferential notches 5 and the circumferential protrusions 6 having corresponding inclined abutment surfaces 7, 8 limiting the excursion of the protrusions 6 in the notches 5 in the radial direction to form a first stopper 801.

A second stopper 801' may be provided in the form of inclined abutment surfaces in the statoric portion 101 opposite the hinged extremity 4 coupled with corresponding inclined portions of the labyrinth seals 201 to further limit the deformation of the device at high pressures as best seen in FIG. 7.

Each labyrinth seal 201 may have a circumferential slot 9 defining a channel putting into fluid communication the space between the statoric and the rotoric portions 101, 201 of the seal 1 with the processing fluid of the turbomachine. Said slot 9 may advantageously extend circumferentially only on part of the circumferential extension of each labyrinth seal 201 to finely control the effect of the intermediate pressure on the deformation of the sealing device.

The statoric part 101 and the rotoric part(s) 201 of the sealing device 1 may advantageously be of the same material, particularly a metallic material such as Aluminum, reinforced PEEK or the like as shown in FIG. 8.

Alternatively the statoric part 101 and the rotoric part(s) 201 of the sealing device may advantageously be of a different material as shown in FIG. 9.

In another embodiment, the statoric part 101 and the outer part 301 of the labyrinth seals are of the same material, while the teeth of the labyrinth seal 501 are of a different material as shown in FIG. 10. The teeth may, for example, be of thermoplastic material while the remaining parts of the sealing elements may be of metallic material such as Aluminum, Steel, Ni-alloys or the like. Teeth are, for example, inserted into a metal cartridge and glued.

In some embodiments, the teeth of the sealing device 501 may be made of an abradable material, or, alternatively, in some other embodiments, the teeth may have an abradable coating formed on a surface thereof disposed opposite and in sealing relation with the rotor.

Bi-material seal solutions, composed, for example, by a cartridge in metal and teeth in thermoplastic, are particularly advantageous as they allow to keep the deformations controlled and the shaft protected from contact, particularly at high pressures, minimizing the volume of costly material.

In a particularly advantageous configuration, the sealing elements or parts thereof are realized through additive manufacturing process.

The term "additive manufacturing" references technologies that grow three-dimensional objects one layer at a time. Each successive layer bonds to the preceding layer of melted or partially melted material. It is possible to use different substances for layering material, including metal powder, thermoplastics, ceramics, composites, glass and even edibles like chocolate.

Objects are digitally defined by computer-aided-design (CAD) software that is used to create .stl files that essentially "slice" the object into ultra-thin layers. This information guides the path of a nozzle or print head as it precisely deposits material upon the preceding layer. Or, a laser or electron beam selectively melts or partially melts in a bed of powdered material. As materials cool or are cured, they fuse together to form a three-dimensional object.

Thanks to additive manufacturing technology, any geometry for the teeth in particular, and for any part of the sealing device in general, can be obtained thus allowing to optimize the design and contain the overall costs.

The result is a compliant seal that is tolerant to rubbing and contacts and that closes the gap since at low pressures (like during ASME PTC10 Type II test). Tighter clearances can be obtained, in fact, already starting from differential pressures of 0.6 bar with a strong limitation at higher pressures to realize a very powerful device, particularly when pressures spilt from various labyrinth regions are used to finely control the locking pressure.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

What is claimed is:

1. A device configured to seal a circumferential gap of a turbomachine between a first turbomachine component and a second turbomachine component which is rotatable relative to the first turbomachine component about a longitudinal axis, the device comprising:
   a first sealing element connected to the first turbomachine component; and
   a second sealing element coupled to the first sealing element,
   wherein the second sealing element has an inner part and an outer part, the inner part of the second sealing element having a plurality of projections extending towards the second machine component to define teeth of a labyrinth seal between a high pressure region and a low pressure region of the turbomachine, the outer part of the second sealing element being elastically coupled with the first sealing element to allow the distance between the first sealing element and the second sealing element to vary depending on fluid dynamic forces acting on the turbomachine components,
   wherein one or more pressure chambers are located between the first sealing element and the second sealing element and configured to be in fluid communication with a processing fluid of the turbomachine to derive from such fluid communication a force acting on the outer part of the second sealing element in a direction of gap closure, and
   further comprising,
   a first stopper element and a second stopper element, the first stopper element to limit the movement of the second sealing element away from the first sealing element towards the second turbomachine component to set a threshold for gap closure and the second stopper element to limit movement of the second sealing element towards the first sealing element,
   wherein the first sealing element has a circumferential notch for receiving a corresponding circumferential protrusion of the second sealing element, the circumferential notch and the circumferential protrusion having a first set of corresponding inclined abutment surfaces limiting the excursion of the protrusion in the notch in the radial direction to form the first stopper element, and
   wherein the first sealing element and the second sealing element having a second set of corresponding inclined abutment surfaces that mate with one another to form the second stopper element disposed radially above the first stopper element.

2. Device according to claim 1, wherein at least one pressure chamber of the device is in communication with the processing fluid of the turbomachine through one or more passageways in the first and/or the second sealing element.

3. Device according to claim 2, wherein at least one passageway is located between a couple of consecutive teeth of the labyrinth seal to collect a fluid having an intermediate pressure between the high and the low pressure zones of the turbomachine.

4. Device according to claim 3, wherein more passageways are provided in fluid communication with consecutive pressure chambers to collect fluid having different pressures to derive forces acting on the outer part of the second sealing element with decreasing intensity from the high to the low pressure zones of the turbomachine.

5. Device according to claim 1, wherein the second sealing element comprises a circumferential slot defining a channel putting into fluid communication at least one pressure chamber of the seal with the processing fluid of the turbomachine.

6. Device according to claim 5, wherein the slot is at least partially located in the high pressure region of the turbomachine.

7. Device according to claim 1, comprising at least two stopper elements axially spaced apart.

8. Device according to claim 1, wherein the second sealing element is an elastically deformable element hinged at the first sealing element, the variable distance between the first sealing element and the second sealing element depending on the deformation of the second sealing element with respect to the first sealing element.

9. Device according to claim 1, wherein the first sealing element and the second sealing element are of the same material, particularly a metallic material such as Aluminum, Steel, Ni-Based alloys or thermoplastic material like reinforced PEEK.

10. Device according to claim 9, wherein the teeth are of thermoplastic material while the remaining parts of the sealing elements are of metallic material such as Aluminum, Steel, Ni-alloys.

11. Device according to claim 1, wherein the first sealing element and the outer part of the second sealing element are of the same material, the inner part of the second sealing element, particularly the teeth of the labyrinth seal, are of a different material.

12. Device according to claim 1, wherein the sealing elements or parts thereof are created by an additive manufacturing process.

13. Device according to claim 1, wherein a plurality of adjacent second sealing elements are circumferentially separated by radial cuts.

14. Device according to claim 13, wherein each second sealing element of the plurality has a circumferential slot defining a channel putting into fluid communication at least one pressure chamber of the device with the processing fluid of the turbomachine, said slot extending circumferentially only on part of the circumferential extension of the second sealing element.

\* \* \* \* \*